(12) United States Patent
Fux et al.

(10) Patent No.: US 7,620,540 B2
(45) Date of Patent: Nov. 17, 2009

(54) METHOD FOR GENERATING TEXT IN A HANDHELD ELECTRONIC DEVICE AND A HANDHELD ELECTRONIC DEVICE INCORPORATING THE SAME

(75) Inventors: Vadim Fux, Waterloo (CA); Jason T. Griffin, Waterloo (CA)

(73) Assignee: Research In Motion Limited, Waterloo, Ontario (CA)

( * ) Notice: Subject to any disclaimer, the term of this patent is extended or adjusted under 35 U.S.C. 154(b) by 717 days.

(21) Appl. No.: 11/119,387

(22) Filed: Apr. 29, 2005

(65) Prior Publication Data

US 2006/0247916 A1 Nov. 2, 2006

(51) Int. Cl.
*G06F 17/21* (2006.01)
*G06F 17/20* (2006.01)
*G06F 17/27* (2006.01)
*G06F 17/28* (2006.01)

(52) U.S. Cl. .............................................. 704/8; 704/9
(58) Field of Classification Search ............... 704/3–10, 704/270–272; 369/47.1–47.13, 52.1, 83–99; 725/37–63; 700/90–94, 213–224

See application file for complete search history.

(56) References Cited

U.S. PATENT DOCUMENTS

| 5,594,638 A * | 1/1997 | Iliff ............................... 705/3 |
| 5,797,098 A | 8/1998 | Schroeder et al. |
| 6,026,410 A * | 2/2000 | Allen et al. ............... 707/104.1 |
| 6,216,102 B1 * | 4/2001 | Martino et al. ................. 704/9 |
| 6,286,064 B1 | 9/2001 | King et al. |
| 6,307,548 B1 * | 10/2001 | Flinchem et al. ............ 715/811 |
| 6,662,025 B1 | 12/2003 | Bond et al. |
| 7,054,818 B2 * | 5/2006 | Sharma et al. .............. 704/270 |
| 7,117,144 B2 * | 10/2006 | Goodman et al. ............... 704/9 |
| 7,133,837 B1 * | 11/2006 | Barnes, Jr. .................... 705/26 |
| 7,165,019 B1 * | 1/2007 | Lee et al. ....................... 704/2 |
| 7,548,849 B2 * | 6/2009 | Fux et al. ....................... 704/9 |
| 2001/0018649 A1 * | 8/2001 | Kasai et al. .................... 704/3 |
| 2003/0073451 A1 * | 4/2003 | Kraft .......................... 455/466 |
| 2004/0006469 A1 * | 1/2004 | Kang ......................... 704/254 |
| 2004/0102957 A1 * | 5/2004 | Levin ............................. 704/3 |
| 2004/0156562 A1 | 8/2004 | Mulvey et al. |
| 2004/0205672 A1 * | 10/2004 | Bates et al. ................. 715/533 |
| 2004/0249629 A1 * | 12/2004 | Webster ......................... 704/4 |
| 2005/0131685 A1 * | 6/2005 | Roth et al. .................. 704/231 |
| 2005/0273332 A1 * | 12/2005 | Scott et al. .................. 704/247 |
| 2006/0041422 A1 * | 2/2006 | Davis et al. .................... 704/9 |
| 2006/0217965 A1 * | 9/2006 | Babu ............................. 704/9 |

FOREIGN PATENT DOCUMENTS

| EP | 1 035 712 A2 | 9/2000 |
| EP | 1187432 | 3/2002 |
| WO | WO 98/33111 A | 7/1998 |
| WO | 2004059958 | 7/2004 |

* cited by examiner

*Primary Examiner*—David R Hudspeth
*Assistant Examiner*—David Kovacek
(74) *Attorney, Agent, or Firm*—Stephen A. Bucchianeri; Brij K. Agarwal; Eckert Seamans Cherin & Mellott, LLC

(57) ABSTRACT

Incoming e-mails, instant messages, SMS, and MMS, are scanned for new language objects such as words, abbreviations, text shortcuts and, in appropriate languages, ideograms, that are placed in a list for use by a text input process of a handheld electronic device to facilitate the generation of text.

13 Claims, 4 Drawing Sheets

METHOD FOR GENERATING TEXT IN A HANDHELD ELECTRONIC DEVICE AND A HANDHELD ELECTRONIC DEVICE INCORPORATING THE SAME

CROSS-REFERENCE TO RELATED APPLICATION

This application is related to concurrently filed U.S. patent application Ser. No. 11/119,455, entitled "METHOD FOR GENERATING TEXT THAT MEETS SPECIFIED CHARACTERISTICS IN A HANDHELD ELECTRONIC DEVICE AND A HANDHELD ELECTRONIC DEVICE INCORPORATING THE SAME".

BACKGROUND

1. Technical Field

Aspects of the invention relate to generating text in a handheld electronic device and to expediting the process, such as for example, where the handheld electronic device receives text from sources external to the device.

2. Background Information

Generating text in a handheld electronic device examples of which include, for instance, personal data assistants (PDA's), handheld computers, two-way pagers, cellular telephones, text messaging devices, and the like, has become a complex process. This is due at least partially to the trend to make these handheld electronic devices smaller and lighter in weight. A limitation in making them smaller has been the physical size of keyboard if the keys are to be actuated directly by human fingers. Generally, there have been two approaches to solving this problem. One is to adapt the ten digit keypad indigenous to mobile phones for text input. This requires each key to support input of multiple characters. The second approach seeks to shrink the traditional full keyboard, such as the "qwerty" keyboard by doubling up characters to reduce the number of keys. In both cases, the input generated by actuation of a key representing multiple characters is ambiguous. Various schemes have been devised to interpret inputs from these multi-character keys. Some schemes require actuation of the key a specific number of times to identify the desired character. Others use software to progressively narrow the possible combinations of letters that can be intended by a specified sequence of key strokes. This latter approach uses multiple lists that can contain, for instance, generic words, application specific words, learned words and the like.

An object of aspects of the invention is to facilitate generating text in a handheld electronic device. In another sense, an object is to assist the generation of text by processes that utilize lists of words, ideograms and the like by gathering new language objects from sources of text external to the handheld electronic device.

DESCRIPTION

Figure 1:
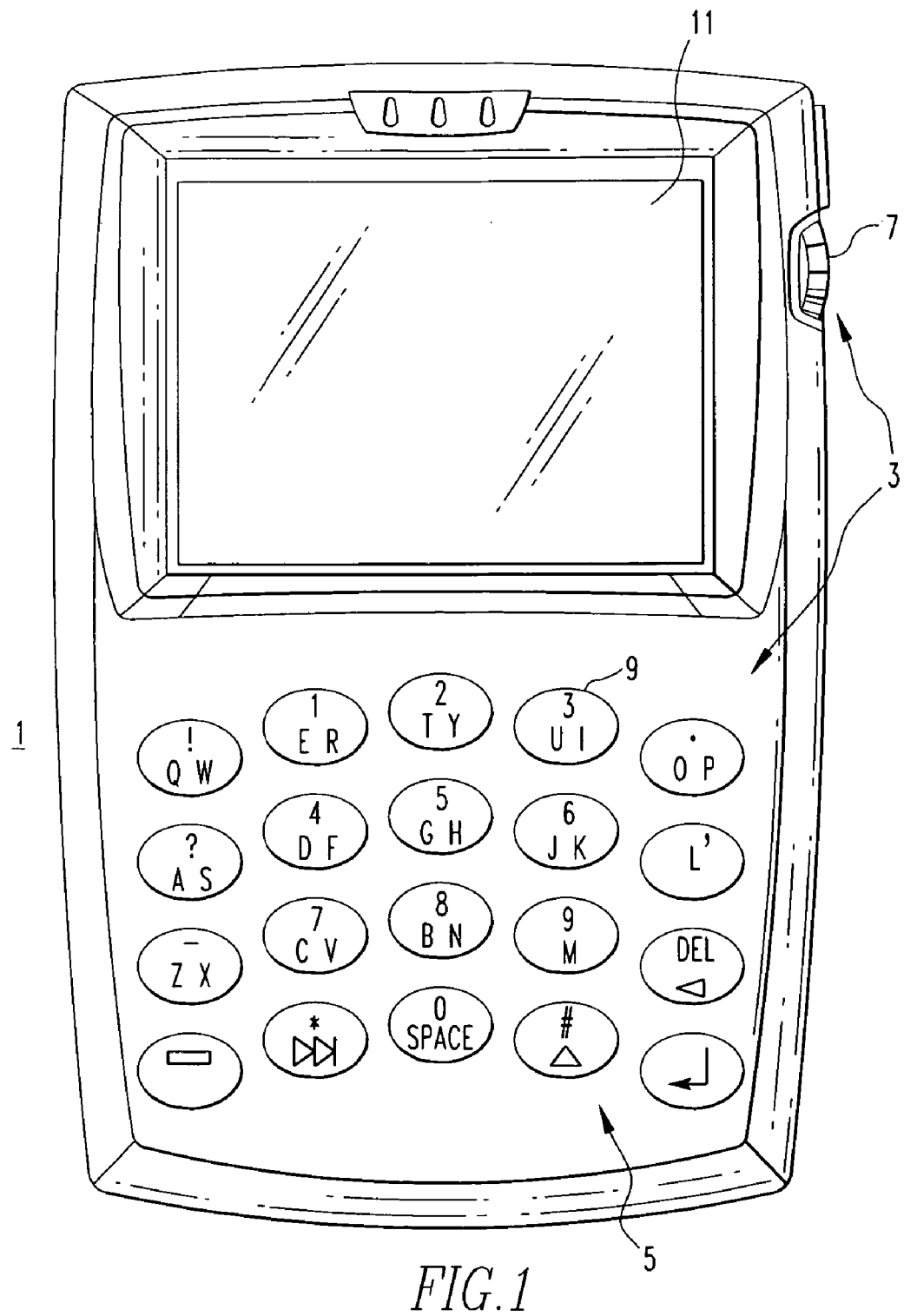
FIG. 1 is a front view of an exemplary handheld electronic device incorporating aspects of the invention.

The generation of text in a handheld electronic device that utilizes lists of language objects, such as for example, words, abbreviations, text shortcuts, and in some languages ideograms and the like to facilitate text generation, adapts to the user's experience by adding new language objects gleaned from text received from sources external to the handheld electronic device. An exemplary external source of text is e-mail messages. Additional non-limiting examples include SMS (Short Message Service), MMS (Multi-Media Service) and instant messages.

More particularly, aspects of the invention are directed to a method of entering text into a handheld electronic device having at least one application for receiving text from sources external to the device and a text input process that accesses at least one list of stored language objects to facilitate text generation. The method comprises processing received text by scanning the received text for any new language object not in any list of stored language objects and adding the new language objects to the at least one list of language objects for use by the text input process in facilitating generation of text. The language objects added to the new list can be selected from the group comprising: words, abbreviations, text shortcuts and ideograms. According to additional aspects of the invention some of the new language objects can be selected for removal from the at least one list of new language objects. Where the new language objects can be stored in a new list that has a selected capacity, a new language object is selected for removal from the new list to make room for a latest new language object when the selected capacity is reached.

Where the handheld electronic device includes input keys, at least some of which input multiple linguistic elements, such as alphabetic characters and strokes used to construct an ideogram, for a user to provide input for generating a desired text, and the input process determines from the sequence of inputs from the input keys an intended language object and wherein the at least one list of storage language objects includes a first list and a new list the latter of which stores the new language objects, the text input process has a preference rule for taking language objects from the first list and the new list to generate the intended text. In such a case, the language objects in the first list can have associated with them a frequency of use and the text input process associates a frequency of use with each of the new language objects stored in the new list. The preference rule can then use these frequencies of use of the language objects in selecting language objects for use in generating the intended text.

Aspects of the invention also embrace a handheld electronic device having a plurality of applications including at least one that receives text from a source external to the handheld electronic device. The device also includes a user interface through which a user inputs linguistic elements and a text generator that has a first language object list and a new language object list and a text input processor. This text input processor comprises processing means selecting new language objects not in the first or new list and adding them to the new list and means using selected language objects stored in the first list and the new list to generate the desired text from the linguistic elements input through the user interface. This handheld electronic device also includes an output means presenting the desired text to the user. Where the new list has a certain capacity for storing language objects, the processing means comprises means removing a selected new language object from the new language object list to make room for a latest new language object not in any list when the certain capacity is reached. The processing means can assign a frequency of use to each new language object when added to the new list and can subsequently reduce this frequency of use. The processing means can select as the new language object to be removed, the language object in the new list with the lowest frequency of use.

FIG. 1 illustrates a wireless handheld electronic device 1, which is but one type of handheld electronic device to which aspects of the invention can be applied. The exemplary handheld electronic device 1 includes an input device 3 in the form of a keyboard 5 and a thumbwheel 7 that are used to control the functions of the handheld electronic device 1 and to generate text and other inputs. The keyboard 5 constitutes a reduced "qwerty" keyboard in which most of the keys 9 are used to input two letters of the alphabet. Thus, initially the input generated by depressing one of these keys is ambiguous in that it is undetermined as to which letter was intended. Various schemes have been devised for disambiguating the inputs generated by these keys 9 assigned multiple letters for input. The particular scheme used is not relevant to aspects of the invention as long as one or more linguistic lists are used in the process. The input provided through the keyboard 5 and thumbwheel 7 are displayed on a display 11 as is well known.

Figure 2:
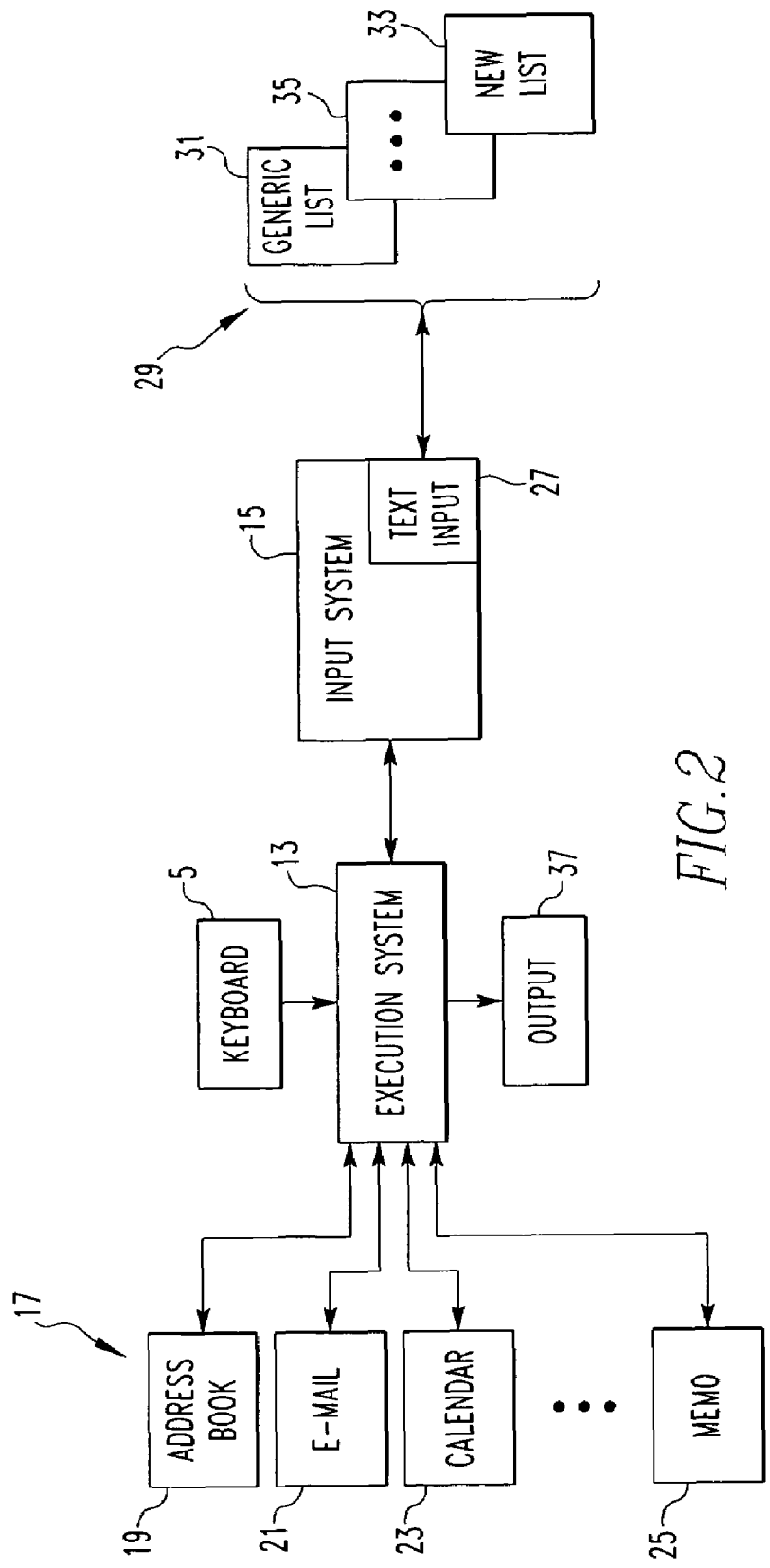
FIG. 2 is a functional diagram in block form illustrating aspects of the invention.

Turning to FIG. 2, the input device 3 provides keystroke inputs to an execution system 13 that may be an operating system, a Java virtual machine, a run time environment or the like. The handheld electronic device 1 implements a plurality of applications 17. These applications can include an address book 19, e-mail 21, a calendar 23, a memo 25, and additional applications such as, for example, spell check and a phone application. Generally these applications 17 require text input that is implemented by a text input process 27, which forms part of an input system 15.

Various types of text input processes 27 can be used that employ lists 29 to facilitate the generation of text. For example, in the exemplary handheld electronic device where the reduced "qwerty" keyboard produces ambiguous inputs, the text input process 27 utilizes software to progressively narrow the possible combination of letters that could be intended by a specified sequence of keystrokes. Such "disambiguation" software is known. Typically, such systems employ a plurality of lists of language objects. By language objects it is meant in the example words and in some languages ideograms. The keystrokes input linguistic elements, which in the case of words, are characters or letters in the alphabet, and in the case of ideograms, strokes that make up the ideogram. The list of language objects can also include abbreviations, and text shortcuts, which are becoming common with the growing use of various kinds of text messaging. Text shortcuts embraces the cryptic and rather clever short representations of common messages, such as, for example, "CUL8R" for "see you later", "PXT" for "please explain that", "SS" for "so sorry", and the like. Lists that can be used by the exemplary disambiguation text input process 27 can include a generic list 31 and a new list 33. Additional lists 35 can include learned words and special word lists such as technical terms for biotechnology. Other types of text input processes 27, such as for example, prediction programs that anticipate a word intended by a user as it is typed in and thereby complete it, could also use word lists. Such a prediction program might be used with a full keyboard.

Known disambiguation programs can assign frequencies of use to the language objects, such as words, in the lists it uses to determine the language object intended by the user. Frequencies of use can be initially assigned based on statistics of common usage and can then be modified through actual usage. It is known for disambiguation programs to incorporate "learned" language objects such as words that were not in the initial lists, but were inserted by the user to drive the output to the intended new word. It is known to assign such learned words an initial frequency of use that is near the high end of the range of frequencies of use. This initial frequency of use is then modified through actual use as with the initially inserted words.

Aspects of the present invention are related to increasing the language objects available for use by the text input process 27. One source for such additional language objects is the e-mail application. Not only is it likely that new language objects contained in incoming e-mails would be used by the user to generate a reply or other e-mail responses, such new language objects could also be language objects that the user might want to use in generating other text inputs.

Figure 3:
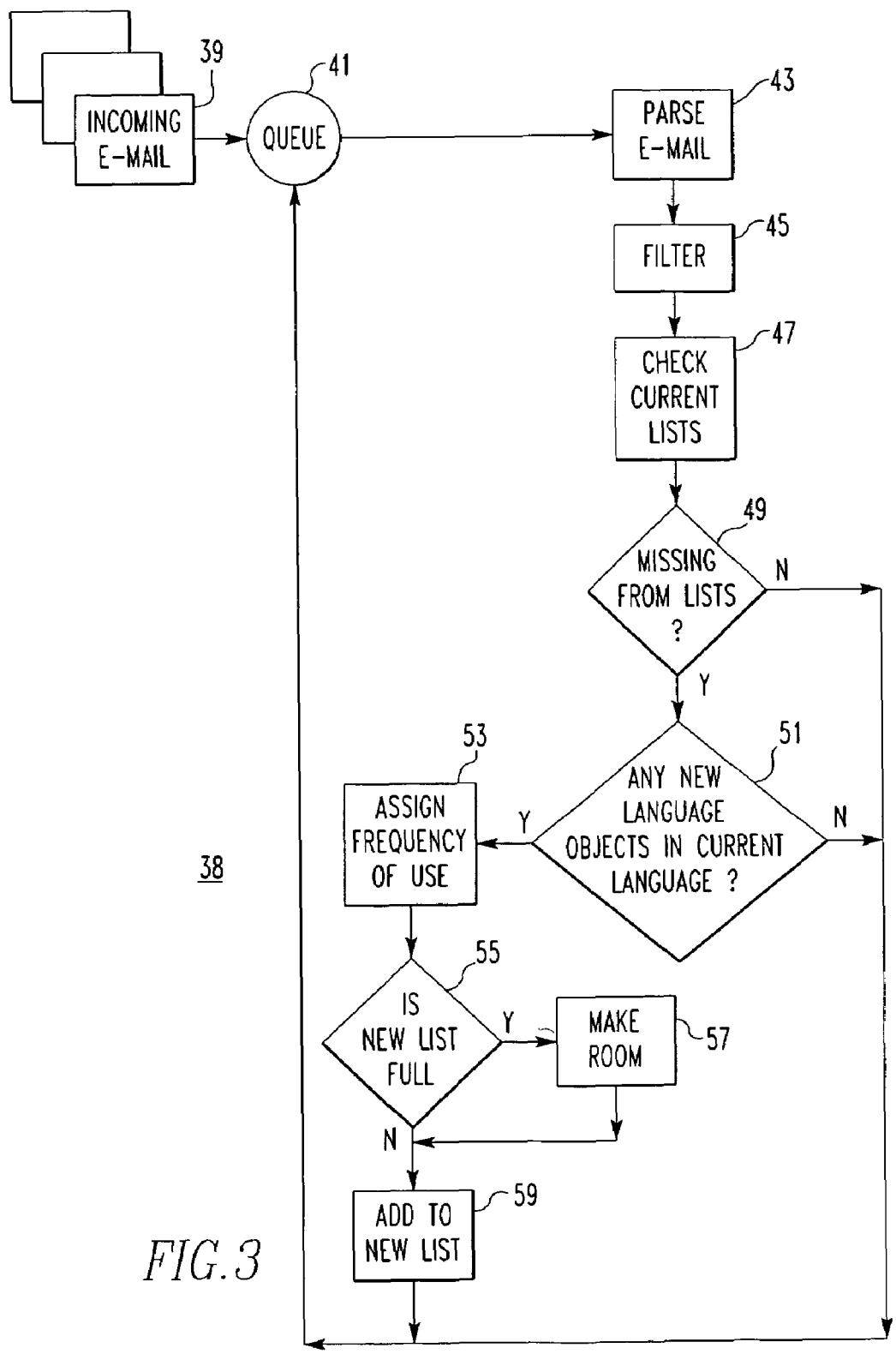
FIG. 3 is a flow chart illustrating operation of aspects of the invention.
Figure 4:
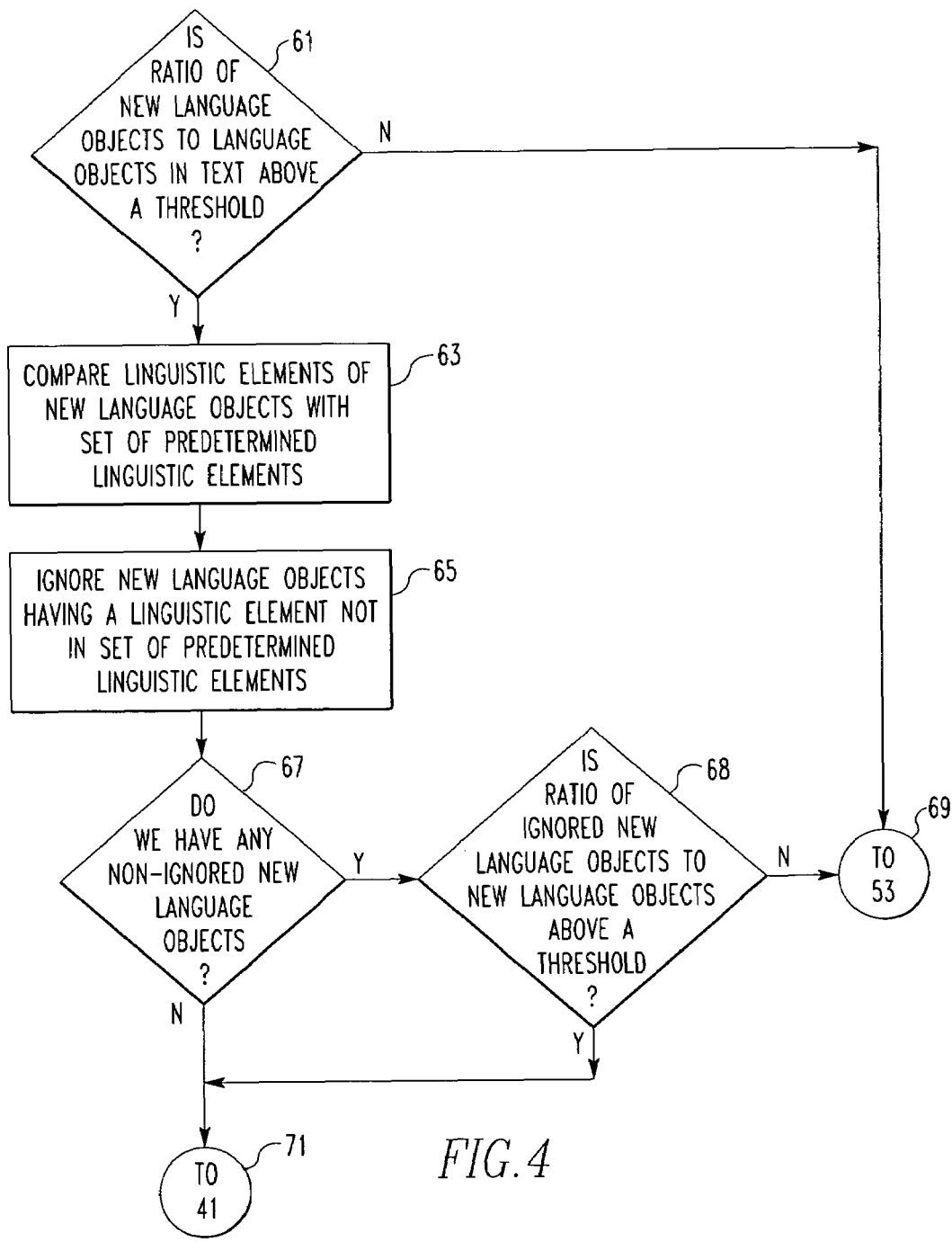
FIG. 4 is a flow chart illustrating operation of aspects of the invention.

FIGS. 3 and 4 illustrate a flow chart of a routine 38 for harvesting new language objects from received e-mails. The incoming e-mails 39 are placed in a queue 41 for processing as permitted by the processing burden on the handheld electronic device 1. Processing begins with scanning the e-mail to parse the message into words (language objects) at 43. The parsed message is then filtered at 45 to remove unwanted components, such as numbers, dates, and the like. The language objects are then compared with the language objects in the current lists at 47. If it is determined at 49 that none of the language objects in the received text are missing from the current lists, such as if all of the language objects in the incoming e-mail message are already in one of the lists as determined at 47, then the routine 38 returns to the queue at 41. The text input process then initiates scanning of the next incoming e-mail in the queue as processing time becomes available.

However, if any of the language objects examined at 47 are determined at 49 to be missing from the current lists, meaning that they are new language objects, processing continues to 51 where it is determined whether any of the new language objects can be considered to be in the current language being employed by the user on the handheld electronic device 1 to input text. An example of the processing at 51 is described in greater detail in FIG. 4 and below. If it is determined at 51 that no new language objects are in the current language, all of the new language objects are ignored, and the routine returns to the queue at 41. If, however, it is determined at 51 that a new language object is in the current language, each such new language object in the current language is assigned a frequency of use at 53. This assigned frequency of use will typically be in the high range of the frequencies of use, for the example, at about the top one third. These new words are placed in the new list 33. However, such a list will have a certain finite capacity, such that over time the new list can become full, as determined at 55. If such is the case, room must be made for this latest entry. Thus, at 57, room is made in the new list by removing one of the earlier entries. In the exemplary embodiment, where the new words are assigned a selected high initial frequency of use, and that frequency of use diminishes through operation of the disambiguation routine of the text input process, the word with the lowest frequency of use can be removed from the new list to make room for the latest new word. Alternatively, the stored new language object having a time stamp that is oldest can be removed. Accordingly, this latest new word is added to the new list at 59 and the routine returns to the queue at 41.

An exemplary language analysis procedure, such as is performed at 51, is depicted in detail in FIG. 4. It is first determined whether the ratio of new language objects in at least a segment of the text to the total number of language objects in the segment exceeds a predetermined threshold. For instance, if an analysis were performed on the text on a line-by-line basis, the routine 38 would determine at 61 whether the quantity of new language objects in any line of text is, for example, ten percent (10%) or more of the quantity of language objects in the line of text. Any appropriate threshold may be employed. Also, segments of the text other than lines may be analyzed, or the entire text message can be analyzed as a whole. The size of the segment may be determined based upon the quantity of text in the message and/or upon other factors. If it is determined at 61 that the threshold has not been met, the new language objects in the text are accepted as being in the current language, and processing continues onward to 53, as is indicated at the numeral 69 in FIG. 4.

On the other hand, continuing the example, if it is determined at 61 that in any line or other segment of text the threshold is exceeded, processing continues at 63 where the linguistic elements in all of the new language objects in the text are compared with a set of predetermined linguistic elements. A determination of the ratio of new language objects to language objects and the set of predetermined linguistic elements are non-limiting examples of specified characteristics that may be at least partially indicative of or particular to one or more predetermined languages.

If, for example, the current language is English, an exemplary set of predetermined linguistic elements indicative of the English language might include, for instance, the twenty-six Latin letters, both upper and lower case, symbols such as an ampersand, asterisk, exclamation point, question mark, and pound sign, and certain predetermined diacritics. If a new language object has a linguistic element other than the linguistic elements in the set of predetermined linguistic elements particular to the current language, the new language object is considered to be in a language other than the current language. If the English language is the current language used on the handheld electronic device 1, such as if the language objects stored in the lists 29 are generally in the English language, the routine 38 can identify and ignore non-English words.

If any new language objects are identified at 63 as having a linguistic element not in the set of predetermined linguistic elements, such new language objects are ignored, as at 65. The routine 38 then determines at 67 whether any non-ignored new language objects exist in the text. If yes, the routine 38 then ascertains at 68 whether a ratio of the ignored new language objects in the text to the new language objects in the text exceeds another threshold, for example fifty percent (50%). Any appropriate threshold may be applied. For instance, if the routine 38 determines at 68 that fifty percent or more of the new language objects were ignored at 65, processing returns to the queue at 41, as is indicated at the numeral 71 in FIG. 4. This can provide an additional safeguard against adding undesirable language objects to the new list 33. On the other hand, if the routine 38 determines at 68 that fewer than fifty percent of the new language objects were ignored at 65, processing continues at 53, as is indicated in FIG. 4 at the numeral 69, where the non-ignored new language objects can be added to the new list 33.

If it is determined at 67 that no non-ignored new language objects exist in the text, processing returns to the queue at 41 as is indicated in FIG. 4 at the numeral 71. It is understood that other language analysis methodologies may be employed.

The above process not only searches for new words in a received e-mail but also for new abbreviations and new text shortcuts, or for ideograms if the language uses ideograms. In addition to scanning e-mails for new words, other text received from sources outside the handheld electronic device can also be scanned for new words. This can include gleaning new language objects from instant messages, SMS (short message service), MMS (multimedia service), and the like.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the claims appended and any and all equivalents thereof.

What is claimed is:

1. A method of entering text into a handheld electronic device having at least one application for receiving text from sources external to the handheld electronic device and a text input process that accesses at least one list of stored language objects to facilitate generation of text, the method comprising:

processing received text received from an external source comprising scanning the received text for any new language object not in any list of stored language objects;

determining whether any of the new language objects can be considered to be objects not in a language currently being employed in the text input process by examining the new language objects to determine whether the new language objects possess one or more specified characteristics at least partially indicative of or particular to a language other than the language currently being employed in the text input process;

ignoring any new language objects which can be considered to be not in said language; and adding any non-ignored new language object to the at least one list of said lists of stored language objects for use by the text input process in generating text.

2. The method of claim 1 further comprising making as at least a portion of said determination whether any of the new language objects can be considered to be objects not in a language currently being employed in the text input process, a determination that a ratio of the quantity of new language objects in a segment of text to the quantity of language objects in the segment of text does not exceed a predetermined threshold.

3. The method of claim 1 wherein the at least one application for receiving text from a source external to the handheld electronic device comprises an e-mail application and the received text comprises received e-mail messages.

4. The method of claim 1 wherein the handheld electronic device comprises input keys at least some of which input multiple linguistic elements used by the text input process to generate the language objects, and wherein the text input process determines from a sequence of inputs from a sequence of inputs from the input keys an intended language object, and the at least one list of a number of lists of stored language units comprises a first list containing language objects and a new list in which the new language objects are stored, the text input process having a preference rule for taking language objects from the first list and the new list to generate text.

5. The method of claim 4 wherein the first list has a frequency of use associated with each language object stored in the first list, the text input process associates a frequency of use with each of the new language objects stored in the new list and the preference rule uses the frequencies of use of the language objects in the first list and the new list in selecting language objects to use in generating the text.

6. The method of claim 1 further comprising making as at least a portion of said determination whether any of the new language objects can be considered to be not in a language currently being employed in the text input process, a determination that a ratio of the quantity of new language objects in a segment of text to the quantity of language objects in the segment of text exceeds a predetermined threshold and, responsive thereto, comparing the new language objects with a set of predetermined linguistic elements that are at least partially indicative of the current language.

7. The method of claim 6 further comprising determining that at least one new language object has a linguistic element other than the linguistic elements within the set of predetermined linguistic elements and, responsive thereto, initiating the ignoring of the at least one new language object.

8. The method of claim 7 further comprising determining that a ratio of the quantity of new language objects in the segment of text to the quantity of language objects in the segment of text does not exceed another predetermined threshold and, responsive thereto, initiating said adding of any non-ignored new language objects to the at least one list of stored language objects.

9. A handheld electronic device comprising:
a plurality of applications that utilize text and at least one of said applications receives text from a source external to the handheld electronic device;
an input device through which a user inputs linguistic elements for generating text;
an input system comprising:
a first list storing language objects;
a new list storing new language objects; and
a text input processor comprising processing means selecting from received text from the source external to the handheld electronic device new language objects not in the first list or the new list, means determining whether any of the new language objects can be considered to be objects not in a language currently being employed in the text input process by examining the new language objects to determine whether the new language objects possess one or more specified characteristics at least partially indicative of or particular to a language other than the language currently being employed in the text input process, ignoring any new language objects which can be considered to be not in said language and adding any non-ignored language objects to the new list, and means for using selected language objects stored in the first list and the new list to generate the desired text from the linguistic elements. input through the user interface; and
output means presenting the desired text to the user.

10. The handheld electronic device of claim 9 wherein the processing means further comprises means making as at least a portion of said determination whether any of the new language objects can be considered to be objects not in a language currently being employed in the text input process a determination that a ratio of the quantity of new language objects in a segment of text to the quantity of language objects in the segment of text does not exceed a predetermined threshold.

11. The handheld electronic device of claim 9 wherein the processing means further comprises means making as at least a portion of said determination whether any of the new language objects can be considered to be objects not in a language currently being employed in a text input process a determination that a ratio of the quantity of new language objects in a segment of text to the quantity of language objects in the segment of text exceeds a predetermined threshold and, responsive thereto, comparing the new language objects with the set of predetermined linguistic elements that are at least partially indicative of the language currently being employed.

12. The handheld electronic device of claim 11 wherein the processing means further comprises means determining that at least one new language object has a linguistic element other than the linguistic element within the set of predetermined linguistic elements and, responsive thereto, initiating the ignoring of the at least one new language object.

13. The handheld electronic device of claim 12 wherein the processing means further comprises means for determining that a ratio of the quantity of ignored new language objects in the segment of text to the quantity of language objects in the segment of text does not exceed another predetermined threshold and, responsive thereto, initiating said adding of any non-ignored new language objects to the at least one list of stored language objects.

* * * * *

UNITED STATES PATENT AND TRADEMARK OFFICE
CERTIFICATE OF CORRECTION

PATENT NO.       : 7,620,540 B2                                Page 1 of 1
APPLICATION NO.  : 11/119387
DATED            : November 17, 2009
INVENTOR(S)      : Fux et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 989 days.

Signed and Sealed this

Fourteenth Day of December, 2010

David J. Kappos
*Director of the United States Patent and Trademark Office*